Aug. 19, 1952     A. J. RITCHIE     2,607,510
SAFETY DEVICE
Filed Feb. 8, 1946
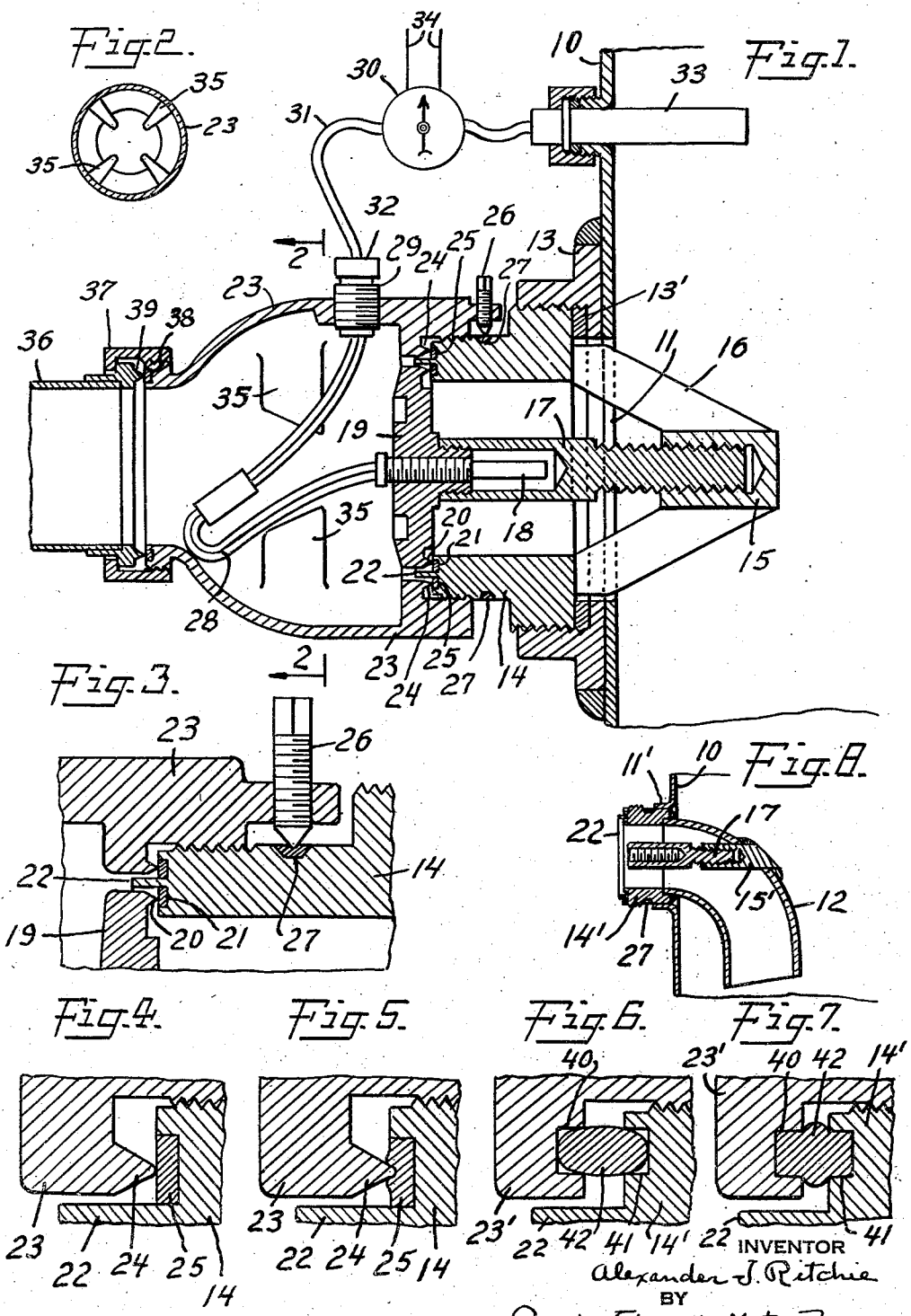

Patented Aug. 19, 1952

2,607,510

UNITED STATES PATENT OFFICE 2,607,510

SAFETY DEVICE

Alexander J. Ritchie, Bayonne, N. J., assignor to Electric Boat Company, Bayonne, N. J., a corporation of New Jersey Application February 8, 1946, Serial No. 646,295

7 Claims. (Cl. 220—89)

This invention relates to safety devices, fluid relief or discharge devices, and the like, and especially to devices of this character responsive to the occurrence of a predetermined condition within a closed container or responsive to other contemplated conditions or circumstances. The invention aims to provide an improved safety or other device of this character.

Safety devices are customarily provided in a wide variety of industrial operations for protection against excessive pressures, temperatures or other dangerous conditions, and devices of the same general character may be used for the relief or discharge of fluids (either gaseous or liquid) under desired conditions or at desired times. Typical examples of such operations are medium and high pressure steam generators, chemical processes handling fluids and especially liquids under conditions of high pressure, high temperature, or both, equipment for handling corrosive liquors, various equipments for discharging specific types of gases or liquids at will or at contemplated intervals or under contemplated conditions such as synthetic smoke generators, and apparatus for discharging poison gas, insecticides, etc. The most common safety devices now used are frangible discs and pop or relief valves. These devices are rarely used singly, two at least being usually provided in order to safeguard the equipment against the frequent failure of the device to operate as contemplated. Among the many causes for the failure of frangible discs to so operate may be mentioned non-uniformity in the discs themselves, changing characteristics due to aging or the like, corrosion of the disc etc. Pop valves require constant maintenance, since they tend to stick, the valve seats are easily corroded leading to erratic operation, and the operating characteristics of the customary springs change due to aging, corrosion or the like.

One of the aims of the present invention is to provide an improved safety device of simple construction and positive action adapted for use in arresting high temperatures, high pressures or other dangerous or contemplated conditions in a wide variety of containers or vessels containing fluids and especially liquids of any sort. The device, in one of its aspects, comprises a disc adapted to close a relief or discharge opening in one wall of the container and operatively connected with a stud or anchor secured to the container proximate the wall opening. An expansible means, preferably of the explosive type such as a squib, is associated with the disc for rupturing its operative connection with the stud to thereby permit the escape of fluid through the wall opening. The rupturing action of the expansible means is appropriately initiated by the occurrence of some predetermined condition within the container, or by other suitable means. In another aspect of the invention, the disc is inwardly deflected by the tightness of its operative connection to the stud so that the amount of the deflection is a measure of the closing or sealing effectiveness of the disc with respect to the wall opening. Increasing pressure within the container reduces the deflection and a predetermined excessive pressure overcomes the deflection entirely and fluid escapes from the container until the excessive pressure within the container is remedied and the disc resumes, to some degree at least, its deflected contour.

The foregoing and other novel features of the invention will be best understood from the following description, taken in conjunction with the accompanying drawing, in which Fig. 1 is a sectional view of the device of the invention (functioning as a safety device) in its present preferred form, Fig. 2 is a transverse section on the section line 2—2 of Fig. 1, Figs. 3, 4 and 5 are enlarged explanatory details of portions of Fig. 1, Figs. 6 and 7 illustrate a modified type of sealing means, and Fig. 8 illustrates a modification of one feature of the device.

Fig. 1 of the drawing illustrates the invention in the form of a safety device operatively connected to a container 10 of which only a portion of one wall is shown. The container may be of any type or form such as a steam boiler, a vessel for carrying out chemical processes or for holding fluids and especially liquids of a corrosive nature, a storage container for liquids, such as synthetic smoke compositions and the like, to be discharged at will or under contemplated conditions etc. In most instances, the container is subjected to conditions that give rise to high pressures, or high temperatures, or both, therein, and the safety device is provided to relieve excessive or dangerous conditions of temperature, pressure, or both. The container has an opening 11 in one wall thereof, which may be the top or side wall. Where only a gas is to be discharged from the container through the opening 11, the opening will usually be near or on the top of the container, and where some or all of the liquid contents of the container is to be discharged, the opening will be beneath the liquid level in the container, or a depending outlet or induction pipe or tube 12 may be connected to the opening as indicated in Fig. 8.

A connecting ring 13 of approximately the same diameter as the opening 11 and registering therewith is welded or otherwise appropriately secured to the outside of the container. The connecting ring 13 is internally threaded and a throat-ring 14 and integral stud or stud 15 is threaded therein. The threaded connection between the rings 13 and 14, and hence of the throat-ring 14 to the container, is hermetic to prevent the escape of fluid therethrough, and if desired this may be assured by the provision of appropriate packing 13' or other suitable sealing expedient. The stud 15 is positioned within the container in the axis of the opening 11 and is integrally connected to the throat-ring 14 by a pyramidal spider 16, the stud being located at the vertex of the spider. Various other constructions are suitable for operatively securing the stud to the container proximate the opening 11 and for securing the throat-ring to the container, and the throat-ring and stud need not be integral, but may be separate parts. Where the outlet pipe 12 is present, the stud may advantageously be welded to that pipe as indicated in Fig. 8, in which case the spider 16 is unnecessary.

The stud 15 has a threaded axial bore or socket in which the shank of a blow-tube 17 is screw-threaded. The blow-tube has a hollow body for the accommodation of expansible, and preferably explosive, means 18, such as a squib. A blow-disc 19 is threaded into the end of the hollow body of the blow-tube 17, and has on its inner face a circular ridge 20 adapted to form a gas-tight seal with an annular seat 21 of relatively soft metal (e. g. Babbitt or other anti-friction bearing metal) inlaid in the outer end face of the throat-ring 14. The outer end face of the throat-ring 14 has an integral guide ring 22 extending outwardly beyond the seat 21 to assist in centrally positioning the blow-disc 19 as it is screwed (by a spanner or the like) into the blow-tube 17, inside diameter of the guide ring being slightly greater than the peripheral diameter of the disc.

A bell-shaped coupling or transformation piece 23 is screw-threaded on the throat-ring 14 and has a circular ridge 24 adapted to form a gas-tight seal with an outer annular seat 25 of relatively soft metal inlaid in the outer end face of the ring 14 surrounding and concentric with the inner seat 21. The coupling 23 is firmly held in its sealing position by a lock bolt 26 adapted to bite into a circumferential seat of relatively soft metal 27 inlaid in the outer cylindrical surface of the ring 14 intermediate its ends. The circular ridges 20 and 24 have slightly rounded apexes which bite into the soft metal seats with a flow of the soft metal around the apex to form a perfect seal, as illustrated in Figs. 4 and 5.

The squib 18 is axially threaded into a central hole in the disc 19. The squib may advantageously be a copper tube filled with an explosive compound preferably slow-burning, such for example, as coarse grain single base nitro-cellulose powder. An electric match, or other suitable primer, is appropriately associated with the explosive compound and its control cable 28 is arranged within the coupling 23 and has a terminal socket 29 screw-threaded in the wall of the coupling. The cable 28 is electrically connected to a contact instrument 30 by a cable 31 having a terminal plug 32 adapted to be inserted in the socket 29. A temperature or pressure responsive device 33 is appropriately positioned within the container 10 and is operatively connected to the instrument 30 and the latter is connected to a suitable source of electric energy 34.

In the operation of the device, the parts hereinbefore mentioned are assembled as described. Assuming that it is desired to protect the container against excessive pressure, the means 33 will be responsive to changes in pressure within the container. The instrument 30 is set so that upon the occurrence of a predetermined excessive pressure within the container the cable 31 will be electrically connected to the source of electric energy 34 and the explosive in the squib 18 will be set off by the electric match or other primer associated therewith. The resulting explosion ruptures the screw-threaded connection between the blow-tube 17 and the disc 19, and the gaseous pressure within the container forces the disc away from its closing position with respect to the opening 11 and against the interior lugs 35 of the coupling 23. The lugs serve to arrest the movement of the disc and provide a stop against which the disc is firmly held by the pressure of the discharging fluid. The free cross-sectional area of the larger part of the coupling 23 is substantially greater than the area of the disc 19, to provide adequate space for the flow of the discharging fluid around the disc while held against the lugs 35. Where it is necessary or desirable to convey the discharging fluid to a storage tank or other disposal means, a discharge pipe 36 is connected to the end of the coupling 23 by a nut 37. The outer end face of the coupling has an inlaid annular seat 38 of soft metal with which a circular ridge 39 of the inner end of the discharge pipe cooperates to form a gas-tight seal, in the manner hereinbefore described.

The rupturing of the operative connection between the blow-tube and the blow-disc by the action of the explosive means is such that these parts can be used only once and they must be replaced by new parts when the device is again reassembled. These parts, as well as the stud and throat-ring, may advantageously be made of brass, and the cost of replacing the expandable parts is insignificant. The container is usually made of steel or steel alloys such for example as stainless steel.

The means 33 may be responsive to temperature changes within the container, and in that case the safety device of the invention will come into operation upon the occurrence of a predetermined excessive temperature within the container. Instead of being automatically controlled by a pressure or temperature responsive device positioned within the container, the rupturing action of the explosive means may be manually controlled in response to a visible or audible danger signal. In other instances the contents of the container 10, confined under a suitable gaseous pressure, may be discharged at will or as contemplated by manual or automatic actuation of the instrument 30.

The blow-disc 19 additionally serves as a safety valve. When the disc is screwed into the blow-tube 17, its circular ridge 20 bites into the seat 21. The resistance to this biting action progressively increases as the disc is screwed in and the metal of the seat flows around the ridge 20, and ultimately becomes so great that further turning of the disc causes its outer surface to deflect inwardly and assume a slightly concave contour. The disc is screwed in until a predetermined deflection or concavity has been thus attained. Any increase in the pressure within the container 10 will decrease this deflection or concavity of the disc's outer surface, and should the pressure increase sufficiently to entirely overcome the deflection, the seal between the ridge 20 and the seat 21 is broken or opened to permit a release of the pressure within the container until the deflection of the disc is sufficiently restored to renew the seal. This safety valve action of the disc is automatic and only comes into action whenever a predetermined excessive or critical pressure exists within the container. When the pressure is relieved below the critical point, the disc automatically resumes its sealing position. The amount of deflection or concavity of the disc, with the normal pressure within the container, is a measure of the excessive pressure required to open or break the seal between the ridge 20 and the seat 21. The curvature of the rounded apex of the ridge 20 (as well as the similar ridges of the device) is correlated to the hardness of the metal of the seat 21. I now prefer to make these seats of an alloy containing about 11% antimony, 2% arsenic and the balance lead. With seats of such an alloy, the radius of curvature of the apex of the ridge may advantageously be $\frac{1}{32}$ inch. With seats of harder metal, the radius of curvature will be smaller and with seats of softer metal, the radius of curvature will be greater.

Where it is undesirable to make use of the safety valve action of the disc 19, it will be so tightly screwed into the blow-tube 17 that its deflection will not be overcome by any pressure within the container below that at which the rupturing action of the squib 18 is initiated by the pressure responsive means 33. On the other hand, the safety valve action of the disc 19 may be advantageously used in conjunction with the rupturing of the operative connection between the disc and blow-tube. Thus, the deflection of the disc 19 may be such that it relieves periodically-occurring excessive pressures of short duration without the relief or discharge of any substantial amount of fluid from the container. The pressure responsive means 33 may then be suitably dampened or time-lagged so that the predetermined excessive pressure will not cause the instrument 30 to initiate the action of the explosive means 18 unless and until that condition of excessive pressure persists for a definite time interval. If the condition of excessive pressure does continue for that time interval, the disc 19 will be blown away from its closing position with respect to the opening 11. The advantage of this dual action of the safety device of the invention is that dangerous pressure conditions of short duration are automatically alleviated without interrupting the operation being carried on in the container 10 or discharging its contents. However, if the dangerous condition persists then full safety relief is afforded.

In Figs. 6 and 7 of the drawing, I have shown a modified form of sealing means particularly adapted to be used under conditions of high temperature. In lieu of the circular ridge 24 of the coupling 23, the coupling 23' of Fig. 6 has an annular recess 40, and the outer face of the throat-ring 14' has an oppositely positioned annular recess 41. A metal sealing ring 42 is positioned between the recesses 40 and 41. When the coupling 23' is screwed onto the throat-ring 14', the metal of the sealing ring 42 flows into and substantially fills the recesses 40 and 41 and also extrudes to some extent into the space between the opposing faces of the coupling and throat-ring, as indicated in Fig. 7, thus forming a very effective seal resistant to high temperatures.

In Fig. 8, hereinbefore briefly referred to, the stud or anchor post 15' is positioned within and welded or otherwise appropriately secured to the discharge or outlet tube 12. The relief or discharge opening in the wall of the container 10 terminates in a circular flange 11', and the throat-ring 14' is welded or otherwise appropriately secured to the inside of the flange. The delivery end of the tube 12 is welded or otherwise appropriately secured to the inner end of the throat-ring 14'. The threaded shank of the blow-tube 17 is screwed into the socket of the stud 15' and in other respects the construction is the same as that of Fig. 1.

The device of the invention is of simple construction, positive in its action and can be constructed at low cost. There are no mechanical parts to get out of order, and no parts whose action is impaired or whose working characteristics change with aging. The action of the explosive means in removing the closure of the relief opening 11 is sure and positive, and the rupturing action of the explosive means is readily initiated by a wide variety of standard recording or indicating instruments now on the market, and in particular instruments responsive to temperature or pressure. Thus, the action of the device is not dependent upon some part positioned in situ whose characteristics are variable and whose positiveness of operation is uncertain. The relief action of the device of the invention is initiated by remote control, and the action is therefore not subject to deleterious influences in the immediate vicinity of the device itself.

I claim:

1. A safety device comprising the combination with a container having an opening in one wall thereof, of a stud secured to the container in the axis of said opening, a blow-tube having a screw-threaded connection with said stud, a disc having a screw-threaded connection with said blow-tube and closing said opening, explosive means within said blow-tube for rupturing the screw-threaded connection between the blow-tube and disc and thereby permit the disc to move away from its closing position with respect to said opening, and means responsive to the occurrence of a predetermined condition within the container for initiating the rupturing action of said explosive means.

2. A safety device comprising the combination with a container having an opening in one wall thereof, of a stud positioned within the container and secured thereto proximate said opening, a throat-ring registering with said opening and hermetically secured to said container and having an annular seat of relatively soft metal on its outer face, a disc connected to said stud and having a circular ridge on one face forming a sealing contact with said annular seat to close said opening, explosive means positioned between said stud and disc for rupturing the connection therebetween and the sealing contact of said circular ridge and said annular seat, and means responsive to the occurrence of a predetermined condition within the container for initiating the rupturing action of said explosive means.

3. A safety device comprising the combination with a container having an opening in one wall thereof, of a stud positioned within the container and secured thereto proximate said opening, a throat-ring registering with said opening and hermetically secured to said container and having an annular seat of relatively soft metal on its outer face, a blow-tube connected to said stud, a disc connected to said blow-tube and having a circular ridge on one face forming a sealing contact with said annular seat to close said opening, explosive means within said blow-tube for rupturing the connection of the disc therewith and the sealing contact of said circular ridge and said annular seat, and means responsive to the occurrence of a predetermined condition within the container for initiating the rupturing action of said explosive means.

4. A safety device comprising the combination with a container containing a fluid under pressure and having an opening in one wall thereof, of a stud positioned within the container and secured thereto proximate said opening, a throat-ring registering with said opening and hermetically secured to the container and having two concentric annular seats of relatively soft metal on its outer face, a coupling connected to said ring and having an interior circular ridge forming a seal with the outer of said annular seats, a disc positioned within said coupling and connected to said stud and closing said opening by forming a seal with the inner of said annular seats, explosive means positioned between said disc and said stud for rupturing the connection of the disc with said stud to permit the fluid pressure within the container to move the disc away from its sealing position with the inner of said annular seats, and means responsive to the occurrence of a predetermined condition within the container for initiating the rupturing action of said explosive means.

5. A safety device comprising the combination with a container containing a fluid under pressure and having an opening in one wall thereof, of a stud secured to the container proximate said opening, a blow-tube secured to said stud and extending through said opening, a throat-ring registering with said opening and hermetically secured to the container, a disc connected to said blow-tube and through the tightness of that connection forming a sealing contact of variable effectiveness with said throat-ring to close said opening, said disc being capable of inward deflection when with a normal pressure within the container its connection to the blow-tube is sufficiently tightened and of returning to its original contour to permit the escape of fluid through the sealing contact whenever a predetermined excessive pressure exists within the container, explosive means within said blow-tube for rupturing the connection between the tube and disc and thereby permitting the escape of fluid from said container through said opening, and means for initiating the rupturing action of said explosive means.

6. A device of the character described comprising the combination with a container having an opening in one wall thereof, of a stud positioned within the container and secured thereto proximate said opening, a blow-tube secured to said stud and extending through said opening, a throat-ring registering with said opening and hermetically secured to said container and having an annular seat of relatively soft metal on its outer face, a disc connected to said blow-tube and having a circular ridge on one face forming a sealing contact with said annular seat and to close said opening, explosive means within said blow-tube for rupturing the connection between the tube and disc, and means for initiating the rupturing action of said explosive means.

7. A device of the character described comprising the combination with a container containing a fluid under pressure and having an opening in one wall thereof, of a stud secured to the container proximate said opening, a blow-tube secured to said stud and extending through said opening, a throat-ring registering with said opening and hermetically secured to said container and having an annular seat of relatively soft metal on its outer face, a disc connected to said blow-tube and having a circular ridge on one face forming a sealing contact of variable effectiveness with said annular seat to close said opening, said disc being capable of inward deflection when with a normal pressure within the container its connection to the blow-tube is sufficiently tightened and of returning to its original contour to permit the escape of fluid through the sealing contact whenever a predetermined excessive pressure exists within the container, explosive means within said blow-tube for rupturing the connection between the tube and disc, and means for initiating the rupturing action of said explosive means.

ALEXANDER J. RITCHIE.

REFERENCES CITED

The following references are of record in the file of this patent:

UNITED STATES PATENTS

| Number | Name | Date |
| --- | --- | --- |
| 1,761,932 | Nutt | June 3, 1930 |
| 1,970,718 | Tryon et al. | Aug. 21, 1934 |
| 1,984,510 | Allen et al. | Dec. 18, 1934 |
| 2,194,442 | Grant, Jr. | Mar. 19, 1940 |
| 2,304,417 | Mason | Dec. 8, 1942 |
| 2,351,526 | Lebus | June 13, 1944 |
| 2,406,502 | Lines | Aug. 27, 1946 |
| 2,408,774 | Goddard et al. | Oct. 8, 1946 |
| 2,436,364 | McDowell | Feb. 17, 1948 |
| 2,480,967 | Ritchie | Sept. 6, 1949 |